UNITED STATES PATENT OFFICE.

ALBERT VÖGLER, OF DORTMUND, GERMANY, ASSIGNOR, BY MESNE ASSIGNMENTS, TO THE CHEMICAL FOUNDATION, INC., A CORPORATION OF DELAWARE.

PROCESS FOR PRODUCING STEEL.

1,342,701.   Specification of Letters Patent.   Patented June 8, 1920.

No Drawing.   Application filed January 24, 1914. Serial No. 814,194.

*To all whom it may concern:*

Be it known that I, ALBERT VÖGLER, manager, a citizen of the German Empire, residing at Dortmund, Germany, have invented certain new and useful Improvements in or Relating to Processes for Producing Steel, of which the following is a specification.

This invention relates to an improved process of producing steel in an open hearth furnace according to the pig iron-ore process and has for its object so to conduct the de-phosphorization of the metal as to cause the whole of the phosphorus to be converted into liquid citrate-soluble slag.

The attainment of this double object, namely, the conversion of the slag into the liquid state and of the whole phosphorus into a citrate-soluble phosphate has hitherto met with difficulties due more particularly to the antagonistic tendencies of the conditions under which these two steps of the process must occur.

It is to be noted that the slag only becomes fluid enough to permit its removal at the high temperature at which the so-called re-phosphorization begins, that is to say, at which a portion of the phosphorus already absorbed by the slag is reduced by the carbon of the bath and is brought back again into the metal. As a result of this the steel could not be brought down to the low content of phosphorus required for high grade carbon steel.

The object of this invention is attained by dividing the process of de-phosphorization into two temperature zones, the final stages of the de-phosphorization being determined by an intensive beginning of the de-carburization. This period is recognized by the abundant occurrence on the bath of the small blue flames of carbon monoxid.

This invention further relates to a mode of producing steel in an open-hearth furnace from iron rich in silicon according to the pig iron and ore process. In the use of iron very rich in silicon the silicic acid which is formed renders the slag so thin as to cause the content of phosphoric acid to fall below the economically admissible limit. By the present process there is obtained a slag rich in phosphate from a pig iron rich in silicon. The process is carried out in such a manner, that in the basic furnace there is formed and removed an acid slag which absorbs the greatest part of the silicon and contains only traces of phosphoric acid, while in the bath there remain phosphate-forming constituents, from which is formed by addition of basic material a slag rich in citrate-soluble phosphates.

By this method it is possible so to conduct the process that the silicic acid and the phosphoric acid are slagged separately. To the silicon iron charged into the hearth furnace as much ore is added as is necessary for oxidizing the silicon. The addition of lime, however, is dispensed with or at least is reduced to a minimum. Almost immediately after the ore charge has been made, an acid slag is formed which owing to its acid character contains only traces of phosphoric acid. The slag is blown off or tapped off as soon as the metal bath is purified of slag, after which steps are taken for recuperating the phosphate slag.

*Example.*

To a pig iron charge containing about 3.5% of carbon, 1.5% or more of silicon, 0.6% of phosphorus or more ore is added for the oxidation of the silicon. There immediately ensues a violent reaction which yields a slag of about 32% $SiO_2$. The slag is removed and ore and lime are added afresh and the charge is now treated with a view to recuperating the powdered Thomas phosphate slag. This phosphate slag still contains, even at the above-mentioned low contents of phosphorus more than 14% of citrate-soluble phosphoric acid so that it is still useful for commercial purposes. The phosphate slag is preferably removed before intensive decarbonization begins to avoid rephosphorization, and the refining of the charge is then finished.

What I claim is:—

1. The process of producing steel in a basic open-hearth furnace from iron rich in silicon by the pig iron and ore process, which consists in first forming an acid slag containing practically all the silicon and only traces of phosphoric acid, drawing off this acid slag, and then forming within the same furnace and with the metal remaining therein a basic slag rich in citrate-soluble phosphates, drawing off this slag and finally refining the steel.

2. The process of converting the phosphorus content of molten iron into liquid citrate-soluble phosphate slag, which consists in first removing the silicon as an acid slag while in a basic furnace, maintaining the temperature of the charge below the point of intensive decarbonization while slagging phosphorus in the same furnace, removing the phosphate slag, and finally refining the metal.

3. The process of producing steel in a basic open-hearth furnace from iron rich in silicon by the pig-iron and ore process, which consists in first forming by addition of iron ore an acid slag containing practically all the silicon and only traces of phosphoric acid, drawing off this acid slag, and then forming by addition of iron ore and lime within the same furnace and with the metal bath remaining therein a basic slag rich in citrate-soluble phosphates, drawing off this slag and finally refining the steel.

In testimony whereof I affix my signature in presence of two witnesses.

ALBERT VÖGLER. [L. S.]

Witnesses:
HELEN NUFER,
ALBERT NUFER.